US Patent Number: 4,770,543
Date of Patent: Sep. 13, 1988
Burghoff et al.

[54] DEVICE IN A MOTOR VEHICLE FOR INDICATING THE OUTSIDE TEMPERATURE

[75] Inventors: Heinz-Georg Burghoff, Reichenbach; Werner Daub, Stuttgart; Gerhard Drücker, Neuhausen, all of Fed. Rep. of Germany

[73] Assignee: Daimer-Benz Aktiengesellschaft, Stuttgart, Fed. Rep. of Germany

[21] Appl. No.: 929,814

[22] Filed: Nov. 13, 1986

[30] Foreign Application Priority Data

Nov. 13, 1985 [DE] Fed. Rep. of Germany ....... 3540204

[51] Int. Cl.$^4$ ..................... G01K 03/00; G01K 13/00
[52] U.S. Cl. ........................... 374/142; 340/52 F; 340/588; 364/424.01; 364/557; 374/102
[58] Field of Search ............... 374/109, 103, 102; 340/52 F, 588, 62; 364/424

[56] References Cited

U.S. PATENT DOCUMENTS

| 3,723,964 | 3/1973 | Lace | 340/52 F |
| 4,317,106 | 2/1982 | Huber | 340/62 X |
| 4,422,066 | 12/1983 | Belcount et al. | 374/142 X |
| 4,489,311 | 12/1984 | Lang et al. | 340/588 X |
| 4,534,214 | 8/1985 | Takahashi | 340/52 F X |
| 4,542,461 | 9/1985 | Eldridge et al. | 340/52 F X |
| 4,555,691 | 11/1985 | Hosaka et al. | 340/62 X |

FOREIGN PATENT DOCUMENTS 2219144 10/1973 Fed. Rep. of Germany.

*Primary Examiner*—Daniel M. Yasich
*Attorney, Agent, or Firm*—Barnes & Thornburg

[57] ABSTRACT

A device in a motor vehicle for indicating the outside temperature has a speed sensor in addition to an outside-temperature sensor. The device has a memory for storing a detected temperature when a speed signal drops below a threshold value. The current temperature is then displayed if it is less than the stored detected temperature plus a pre-determined amount; otherwise, the stored detected temperature is displayed. When the vehicle speed rises above a second threshold value, a delay time determiner determines the delay time dependent on the vehicle speed, and a time delay is activated. The time delay causes the indicator to display the current temperature upon expiration of a period of time equal to the delay time following the activation of the time delay.

7 Claims, 1 Drawing Sheet

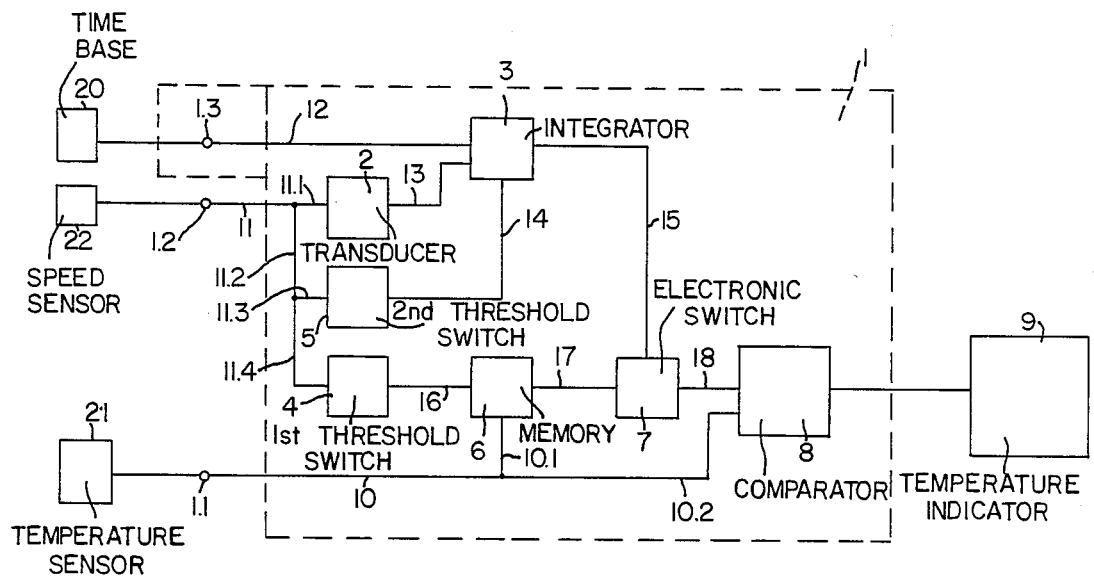

DEVICE IN A MOTOR VEHICLE FOR INDICATING THE OUTSIDE TEMPERATURE

The present invention relates to a device for controlling the indication of the temperature outside a motor vehicle by a temperature indicator.

Devices for indicating the outside temperature generally have an outside temperature sensor, and a temperature indicator inside the motor vehicle. The temperature signals can be processed by analog or digital means. A precondition for a sufficiently accurate reading with an accuracy in the 1° C. range is that, under all possible operating conditions of the motor vehicle, the outside-temperature sensor should only be subjected to outside air, the temperature of which is not influenced by the motor vehicle. Furthermore, the temperature sensor should be insulated against heat radiation or heat conduction from the motor vehicle or its engine.

Under boundary conditions, such as design and costs specific to the vehicle, the first requirement is satisfied when the outside-temperature sensor is mounted in a known way at the front of the vehicle, as shown in German Unexamined Published Patent Application No. 2,219,144 published Oct. 25, 1973. In that arrangement, however, it is necessary to allow for a heating of the sensor by the waste heat from the engine, at least when the vehicle is at a standstill. Appropriately designed heat insulation, although retarding the heating of the sensor, would nevertheless have the adverse effect that, for example when the vehicle leaves a garage, the sensor could not cool from a higher temperature to a lower outside temperature as quickly as before.

To solve this problem, a device of the generic type is made for vehicles manufactured by Pontiac. In this device, a speed sensor is additionally provided and, when the motor vehicle comes to a stop, the last temperature detected by the outside-temperature sensor is indicated by the outside-temperature indicator, specifically independently of the possible differing outside temperatures sensed during the standstill. Only after a predetermined delay time after the motor vehicle drives on is the temperature last indicated erased and the currently detected temperature indicated again. At the same time, the delay time is selected so that the outside-temperature sensor can reset automatically to the current temperature. The delay time can range up to ten minutes.

Since even extreme situations are taken into account in order to fix the delay time, in practice there is usually a needlessly long delay in indicating the current temperature again. Moreover, situations in which a delay is superfluous even when the motor vehicle is stopped, for example the sensor installed at the front and the wind coming from the front, are not taken into consideration. In these cases, therefore, a current outside temperature correctly detected by the sensor is not indicated for a certain amount of time, so that temperature changes possibly occurring within this period of time will not be indicated to the driver.

An object of the present invention is to provide a device for controlling the display of the outside temperature in a vehicle, in which the indication of the currently detected outside temperature is not blocked for an unnecessarily long time.

This and other objects are attained by providing device for controlling the indication of a temperature outside a motor vehicle by a temperature indicator with a storage device and a comparator. The storage device stores a detected temperature when the vehicle speed signal from a speed sensor drops below a first threshold value. The comparator compares the currently detected temperature with the stored detected temperature, and then causes the indicator to display the currently detected temperature if it is less than the stored detected temperature plus a pre-determined amount; and display the stored detected temperature if the currently detected temperature is greater than the stored detected temperature plus a pre-determined amount.

Further, in a preferred embodiment, the device also has a delay time determiner and a time delay. The delay time determiner determines a delay time dependent on the vehicle speed signal after it rises above a second threshold value. The time delay is activated when the vehicle speed signal rises above the second threshold value and switches the comparator to cause the indicator to display the currently detected temperature upon expiration of a period of time equal to the delay time after activation of the time delay.

Further objects, features, and advantages of the present invention will become more apparent from the following description when taken with the accompanying drawings, which show for purposes of illustration only, an embodiment constructed in accordance with the present invention.

BRIEF DESCRIPTION OF THE DRAWING

The drawing FIGURE is a block diagram of a preferred embodiment of the present invention.

DETAILED DESCRIPTION OF THE DRAWING

In the drawing FIGURE, reference numeral 1 denotes an evaluation unit of the device, which, in preferred embodiments, is a microprocessor. The evaluation unit 1 contains the following components: a transducer 2 with a characteristics memory, an integrator 3, a first threshold switch 4, a second threshold switch 5, a memory 6, an electronic switch 7 and a comparator 8. The evaluation unit 1 is connected to an outside-temperature indicator 9.

On its input side, the evaluation unit 1 has three terminals 1.1, 1.2 and 1.3, the terminal 1.1 being connected to an outside-temperature sensor 21, the terminal 1.2 being connected to a speed sensor 22 and the terminal 1.3 being connected to a time base 20. The outside-temperature sensor 21 is preferably mounted at the front of the motor vehicle and is exposed to the relative wind. The signal from the outside-temperature sensor 21, arriving via the terminal 1.1, is inputted to the memory 6 via the line 10–10.1 and is also inputted to the comparator 8 via the line 10–10.2. Similarly, the signal from the speed sensor 22, arriving via the terminal 1.2, is fed to the transducer 2 via the line 11–11.1, the second threshold switch 5 via the line 11–11.2–11.3 and to the first threshold switch 4 via the line 11–11.2–11.4. Finally, the terminal 1.3 is connected via the line 12 to the integrator 3.

The integrator 3 has its inputs connected to the output of the transducer 2 via the line 13, to the output of the threshold switch 5 via the line 14 and to the electronic switch 7 via the line 15. The first threshold switch 4 is connected to the input of memory 6 via the line 16. The memory 6 is connected to the electronic switch 7 via the line 17. The electronic switch 7 is connected via the line 18 to the input of comparator 8.

In this preferred embodiment, the first threshold switch 4 switches at a vehicle speed of less than 20 km/h, whereas the threshold switch 5 switches at a vehicle speed of more than 20 km/h.

The transducer 2 stores characteristic or parameters, from which the delay times are derived in response to the speed and driving behavior of the vehicle. The transducer 2 is a component of the evaluation unit 1 that is developed as a microprocessor and corresponds, for example, to the commercially available HD 44790 microprocessor from the Hitachi HMCS 40 Series. These speed-dependent delay times are pre-determined in tests as a function of the mounting point of the temperature sensor, the vehicle type, and other factors. If the outside-temperature sensor is exposed to the relative wind as freely as possible so there is not insulation, then in a preferred embodiment, the delay times are 1 minute at a vehicle speed of 120 km/h, 2 minutes at 80 km/h and 5 minutes at 20 km/h. If, on the other hand, the sensor is surrounded by thermal insulation, the delay times are set at 2 minutes at a vehicle speed of 120 km/h, 4 minutes at 80 km/h and 8 minutes at 50 km/h, for example.

The mode of operation of the device is as follows:

When the vehicle decelerates and reaches the lower threshold speed of 20 km/h, the first threshold switch 4 switches and activates the memory 6, so that the temperature detected at this moment by the outside-temperature sensor via the line 10–10.1 can be received in the memory 6. The currently detected outside temperature is also transmitted via the line 10–10.2 to the comparator 8. The comparator 8 includes logic circuitry which allows it to compare input signals and selectively gate one of these signals as an input to the indicator 9. The comparator 8 compares the currently detected temperature with the temperature which is stored in the memory 6 and is also transmitted to it via the closed electronic switch 7. At the moment the lower threshold speed is reached, these two temperatures are identical, so that the comparator 8 activates the outside-temperature indicator 9 to indicate the current outside temperature detected.

The currently detected outside temperature is always indicated when it is equal to or less than the value of the stored temperature plus a pre-determined amount. In preferred embodiments, this pre-determined amount ranges from 1° to 2.5° C. In other words, the comparator determines whether the current temperature is greater than the value of the stored temperature plus 1° to 2.5° C. If the current temperature is greater, the comparator 8 activates the outside-temperature indicator 9 to indicate the stored temperature. For example, the current temperature may exceed the value of the stored temperature plus 1° to 2.5° C. if the outside-temperature sensor has become heated by waste heat from the engine when the vehicle has stopped.

When the vehicle accelerates again, whether after stopping at traffic lights or after a longer interruption in driving, and the upper threshold speed of 20 km/h is reached, the second threshold switch 5 switches and thereby activates the integrator 3. Depending on the vehicle speed reached, for example 80 km/h, the delay time $T_v$ corresponding to this speed (as determined by the stored characteristics), for example 2 minutes, is transmitted to the integrator 3 by the transducer 2. The integrator 3 then forms the integral $\int dt/T_v$, so that the integrator will transmit a signal "1" at its output when the delay time $T_v$ has expired. This signal "1" in turn causes the electronic switch 7 to open, so that the stored temperature no longer passes from the memory 6 to the comparator 8. The comparator 8 then activates the outside-temperature indicator 9 to continuously indicate the temperature currently detected.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Device in a motor vehicle for indicating an outside temperature, having an outside-temperature sensor and a speed sensor, an outside-temperature indicator inside the motor vehicle and an evaluation unit activating the outside-temperature indicator and having a memory, signals from the outside-temperature sensor and the speed sensor being inputs to the evaluation unit, which, during deceleration of the motor vehicle, at a lower limiting speed, as a function of the speed signal receives the temperature last detected by the outside-temperature sensor into the memory and activates the outside-temperature indicator to indicate this temperature, whereas, during the subsequent acceleration of the motor vehicle, at an upper limiting speed, as function of the selected speed signal the evaluation unit activate the outside-temperature indicator to blank out the temperature last indicated and to indicate a currently detected temperature, only after a speed dependent pre-determined delay time, comprising:

first threshold switch means, for receiving a selected speed signal from the speed sensor when the lower limiting speed is reached, and activating the memory; the memory being connected via an electronic switch to a comparator means which activates the outside-temperature indicator and to which the signal of the temperature currently detected by the outside-temperature sensor is likewise fed, wherein the comparator means includes means for activating the outside-temperature indicator to indicate the stored temperature only when the currently detected temperature exceeds the stored temperature by a pre-determined temperature amount, but activates the outside-temperature indicator to indicate the currently detected temperature, when the currently detected temperature is less than the amount of the stored temperature plus the pre-determined amount;

second threshold switch means for receiving the signal from the speed sensor when the upper limiting speed is reached, and activating an integrator which is connected to a time base means and to a transducer, to which the signal from the speed sensor is likewise fed, with the integrator being connected to the electronic switch to open the switch after the expiration of a vehicle characteristic speed-dependent pre-determined delay time, so that, after the expiration of the pre-determined delay time, the comparator means activates the outside-temperature indicator to indicate the currently detected temperature.

2. A device for controlling the indication of a temperature outside a motor vehicle by a temperature indicator means, said device receiving temperature signals from a temperature sensor and vehicle speed signals from a speed sensor, said device comprising:

memory means for storing a detected temperature signal from the temperature sensor when said vehicle speed signal from the speed sensor drops below a first threshold value;

comparator means for comparing a currently detected temperature signal from the temperature sensor with said stored detected temperature signal when said vehicle speed signal from the speed sensor is below said first threshold value, and causing said indicator means to display:

the currently detected temperature signal if said currently detected temperature signal is less than the stored detected temperature signal plus a pre-determined temperature amount; and the stored detected temperature signal if said currently detected temperature signal is greater than said stored detected temperature signal plus said pre-determined amount; and having a memory with stored space speed and driving characteristics of said vehicle for determining a delay time dependent on said vehicle speed signal after said speed signal rises above a second threshold value; and time delay means activated when said vehicle speed signal rises above said second threshold value for switching said comparator means to cause said indicator means to display the currently detected temperature upon expiration of a period of time equal to said delay time from said delay time determining means after activation of said time delay means.

3. The device of claim 2, wherein said pre-determined temperature amount is between 1° to 2.5° C.

4. The device of claim 2, further comprising first threshold switch means for producing a first activating signal to activate said memory means when said vehicle speed signal falls below said first threshold value.

5. The device of claim 4, further comprising second threshold switch means connected to said speed sensor for producing a second activation signal to activate said time delay means when said vehicle speed signal rises above second threshold value.

6. The device of claim 5, wherein said delay time determining means includes transducer means connected to said speed sensor for producing delay time signals corresponding to said vehicle speed signals received from said speed sensor.

7. The device for claim 6, wherein said time delay means includes integrator means connected to:

a time base to receive said time signals from said time base;

transducer means to receive said delay time signals from said transducer means; and said second threshold switch means to receive said second activation signal from said second threshold switch means;

said integrator means outputting an integral signal when said integral of time base signal equals said delay time signal to disable first switch threshold means to cause said comparator means to cause said indicator means to display said currently detected temperature.

* * * * *